United States Patent
Freis et al.

(10) Patent No.: US 9,346,241 B2
(45) Date of Patent: *May 24, 2016

(54) COMPOSITE PANEL FOR JOINING WITH A CLINCH JOINT AND METHOD OF FORMING A CLINCH JOINT

(71) Applicant: Ford Global Technologies, LLC, Dearborn, MI (US)

(72) Inventors: Amanda Kay Freis, Ann Arbor, MI (US); Aindrea McKelvey Campbell, Beverly Hills, MI (US); Daniel Quinn Houston, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 180 days.

This patent is subject to a terminal disclaimer.

(21) Appl. No.: 14/155,694

(22) Filed: Jan. 15, 2014

(65) Prior Publication Data

US 2015/0197070 A1 Jul. 16, 2015

(51) Int. Cl.
*B32B 3/28* (2006.01)
*B32B 7/08* (2006.01)
(Continued)

(52) U.S. Cl.
CPC ............... *B32B 7/045* (2013.01); *B29C 65/56* (2013.01); *B29C 66/1312* (2013.01);
(Continued)

(58) Field of Classification Search
CPC ............ B32B 7/04; B32B 7/045; B32B 7/08; B32B 15/08; B32B 15/14; B32B 15/18; B32B 15/20; B32B 27/06; B32B 2250/03; B32B 2607/00; B32B 3/06; B32B 3/28; B32B 5/06; B21D 22/06; Y10T 428/24174; Y10T 428/24273–428/24331; Y10T 428/24479; Y10T 428/2452
USPC ......... 428/119, 120, 131–140, 156, 159, 161, 428/162, 164, 171, 172, 173, 174
See application file for complete search history.

(56) References Cited

U.S. PATENT DOCUMENTS 4,207,282 A * 6/1980 Grisch ................... B29C 70/00
                                                          264/113
5,884,386 A * 3/1999 Blacket ................ B21D 39/031
                                                          29/432.2

(Continued)

FOREIGN PATENT DOCUMENTS

DE   EP 0247239 A2 * 12/1987 .............. B32B 15/08
DE       19800038       7/1999
(Continued)

OTHER PUBLICATIONS

Machine Translation of EP 0247239 Blumel et al. Obtained from EPO on Feb. 24, 2016.*

*Primary Examiner* — Aaron Austin
*Assistant Examiner* — Megha Gaitonde
(74) *Attorney, Agent, or Firm* — Damian Porcari; Brooks Kushman P.C.

(57) ABSTRACT

An assembly comprising a first composite fiber reinforced part that is joined to a second part by a clinch joint. The first part includes a first layer of resin that is reinforced with fibers and a second layer of resin that is devoid of fibers and applied to one side of the first layer of fiber reinforced resin. The second part contacts the first layer of the first part. The first part and second part are joined by a clinch joint including a pressed out portion that is pressed into a clinching portion. The second layer of resin contains the fibers in the first part. An alternative assembly has fiber-free intended clinch joint forming areas that extend through the first part. A method is provided in which a first part including a first layer of resin reinforced with fibers is molded with a second layer of resin on one side of the first layer is joined by a clinch joint to a second part.

3 Claims, 3 Drawing Sheets

(51) Int. Cl.
  *B32B 7/04* (2006.01)
  *B32B 15/08* (2006.01)
  *B32B 27/20* (2006.01)
  *B32B 15/18* (2006.01)
  *B32B 15/20* (2006.01)
  *B32B 27/08* (2006.01)
  *B32B 1/00* (2006.01)
  *B29C 65/56* (2006.01)
  *B29C 65/00* (2006.01)
  *B29C 65/60* (2006.01)

(52) U.S. Cl.
  CPC ............... *B29C 66/21* (2013.01); *B29C 66/54* (2013.01); *B29C 66/721* (2013.01); *B29C 66/723* (2013.01); *B32B 1/00* (2013.01); *B32B 7/08* (2013.01); *B32B 15/08* (2013.01); *B32B 15/18* (2013.01); *B32B 15/20* (2013.01); *B32B 27/08* (2013.01); *B32B 27/20* (2013.01); *B29C 65/608* (2013.01); *B29C 66/8322* (2013.01); *B32B 2262/101* (2013.01); *B32B 2262/106* (2013.01); *B32B 2307/726* (2013.01); *B32B 2605/00* (2013.01); *B32B 2607/00* (2013.01); *Y10T 29/4998* (2015.01); *Y10T 428/24521* (2015.01); *Y10T 428/24545* (2015.01)

(56) References Cited

U.S. PATENT DOCUMENTS

| | | | |
|---|---|---|---|
| 6,296,330 B1 * | 10/2001 | Hall | B62D 55/27 305/161 |
| 2010/0212131 A1 * | 8/2010 | Sawdon | B21D 39/031 29/243.5 |
| 2011/0274897 A1 * | 11/2011 | Dauner | B29C 70/088 428/203 |
| 2014/0212616 A1 * | 7/2014 | McKelvey Campbell | B23P 11/00 428/43 |

FOREIGN PATENT DOCUMENTS

| | | |
|---|---|---|
| DE | 102010014539 | 10/2001 |
| DE | 102011051301 | 12/2012 |
| EP | 2502683 | 9/2012 |

* cited by examiner

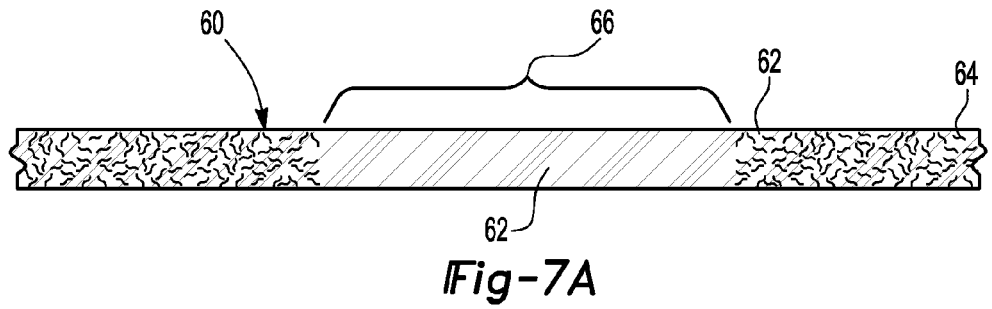
Fig-7A
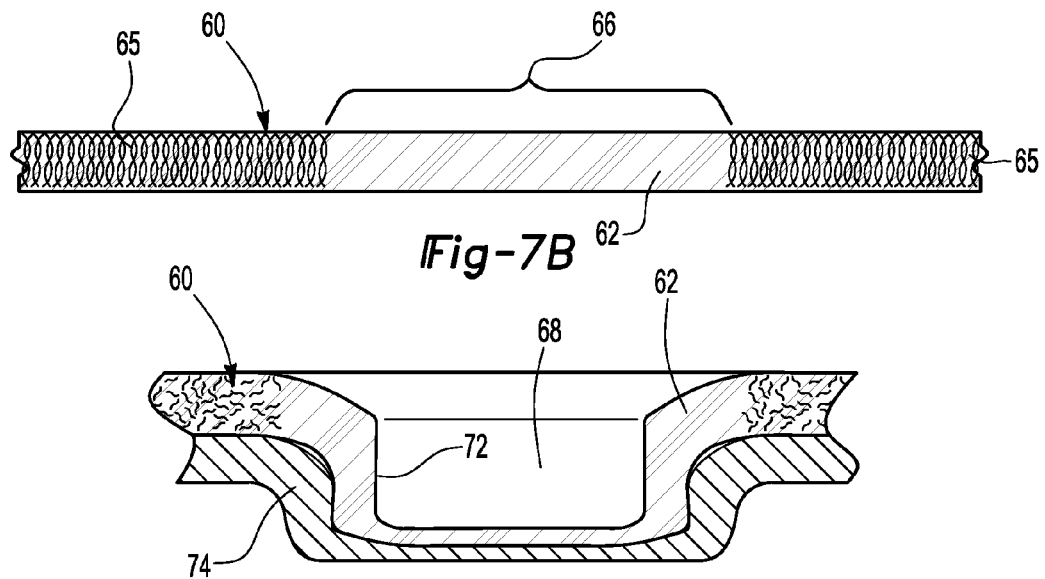
Fig-7B
Fig-8A
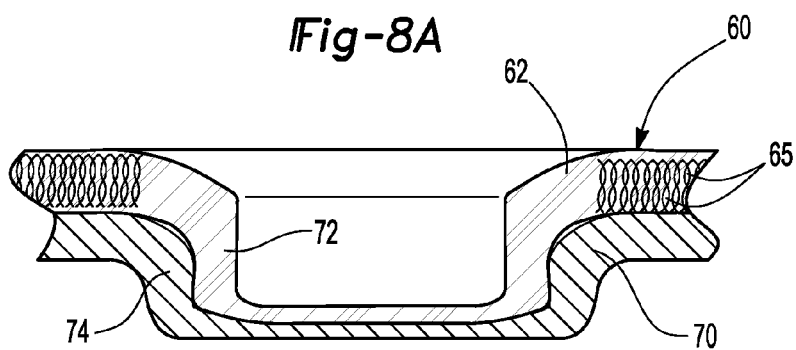
Fig-8B

COMPOSITE PANEL FOR JOINING WITH A CLINCH JOINT AND METHOD OF FORMING A CLINCH JOINT

TECHNICAL FIELD

A composite panel and method of making the composite panel that is adapted to be joined to another panel with a clinch joint.

BACKGROUND

Composite panels are used to manufacture structural and body panels for vehicles and in other products. Composite panels are made of polymeric resins that are reinforced with carbon fibers, glass fibers, natural fibers, or the like. Composite panels are strong, light weight and may be used in a wide variety of product applications.

Composite panels may be assembled to other panels made of aluminum, steel or composites. Common fasteners, rivets or clinch joints may be used to join the panels together. One problem with clinch joints is that the reinforcing fibers may break through the surface of the composite panel. Carbon or natural fiber reinforcing fibers may absorb moisture if they break through the surface of the composite panel. Fibers that absorb moisture can be objectionable because they may cause corrosion and may weaken the joints. Carbon fibers when exposed to moisture may cause galvanic corrosion when they come into contact with metal parts or fasteners.

The above problems and other problems are addressed by this disclosure as summarized below.

SUMMARY

According to one aspect of this disclosure, an assembly is provided that is joined by a clinch joint. The assembly comprises a first part including a first layer of resin reinforced with fibers and a second layer of resin applied to one side of the first layer of resin. A second part contacts the first layer of first part and is joined to the first part by the clinch joint. The clinch joint includes a pressed-out portion of the first part that is pressed into a clinching portion of the second panel with the second layer of resin containing the fibers in the first part.

According to other aspects of this disclosure as it relates to the assembly, the first part may be formed in a compression molding process with the first layer being formed in a first step and the second layer being applied to the first layer after the first layer is formed. Alternatively, the first part may be formed in a compression molding process with the first layer and the second layer being formed in a single step. The second layer may be formed against a textured surface of a compression molding die that inhibits the fibers from entering the second layer.

The second layer may be provided on a partial area on the one side of the first layer where the clinch joint joins the first part to the second part. A plurality of clinch joints may be formed to join the first part to the second part and the second layer may be provided on a plurality of partial areas on the one side of the first layer where the clinch joints join the first part to the second part. Alternatively, the second layer may be provided on the entire one side of the first layer.

The fibers may be carbon fibers, glass fibers, talc, or natural fibers. The second part may be formed of steel, aluminum, magnesium, or composite resin.

According to another aspect of this disclosure, a method is provided for forming a clinch joint for joining a plurality of panels. The method comprises molding a first part that includes a first layer of resin reinforced with fibers. A second layer of resin is molded onto one side of the first layer of resin. A second part is assembled to the first layer of first part and the first part is joined to the second part by pressing a pressed-out portion of the first part into a clinching portion of the second panel. The second layer of resin inhibits the fibers in the first layer from protruding from the first part in the area of the clinch joint.

According to other aspects of the method, the molding steps may be performed in a compression molding process wherein the first layer is formed in a first step and the second layer is applied to the first layer in a second step after the first layer is formed. Alternatively, the molding steps may be performed in a compression molding process wherein the first layer and the second layer are formed in a single step, and wherein the second layer is formed against a textured surface of a compression molding die that inhibits the fibers from entering the second layer.

The step of molding the second layer may further comprise molding the second layer to a partial area on the one side of the first layer where the clinch joint joins the first part to the second part. A plurality of clinch joints may be formed to join the first part to the second part and the step of molding the second layer may further comprise molding the second layer to a plurality of partial areas on the one side of the first layer where the clinch joints join the first part to the second part. Alternatively, the step of molding the second layer may further comprise molding the second layer on one entire side of the first layer.

According to another aspect of this disclosure, an assembly including a first composite panel formed of a fiber reinforced resin that has no fibers in a predetermined intended clinch joint forming area. A clinch joint formed in the intended clinch joining area joins the first panel to a second panel and exposed fibers are avoided on the clinch joint.

The above aspects and other aspects of this disclosure are described in greater detail below with reference to the attached drawings.

BRIEF DESCRIPTION OF THE DRAWINGS

FIGS. 7A and 7B are fragmentary cross-sectional views of alternative embodiments of a first composite panel that has fiber reinforcements in resin except where a clinch joint is to be formed.

FIGS. 8A and 8B are fragmentary cross-sectional views of the panels shown in FIGS. 7A and 7B, respectively, being joined to a second panel by a clinch joint.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
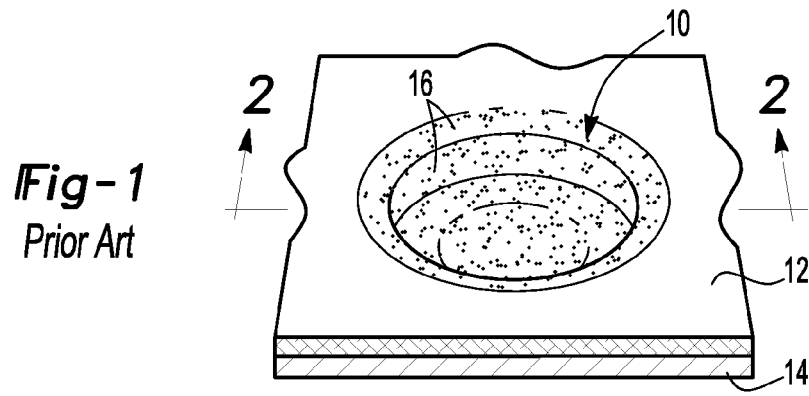
FIG. 1 is a fragmentary perspective view of a prior art clinch joint joining a composite fiber reinforced panel to another panel.
Figure 2:
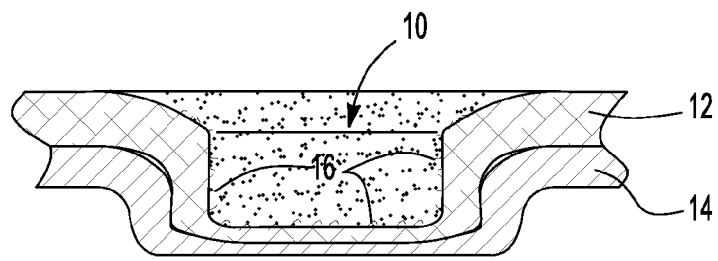
FIG. 2 is a cross-sectional view taken along the line 2-2 in FIG. 1.

Referring to FIGS. 1 and 2, a prior art clinch joint 10 is shown connecting a fiber reinforced composite panel 12 to a substrate panel 14. The panels 12, 14 are partially shown in FIGS. 1 and 2. The clinch joint 10 would in most cases be located in a flange area of a larger panel.

The stippling in FIG. 1 is provided to denote exposed fibers 16 that are exposed in the course of forming the clinch joint 10. Fibers from the fiber reinforced panel 12 may extend into the clinch joint 10, as shown in FIG. 2. The exposed fibers 16 may absorb moisture and lead to a reduction in the holding force of the clinch joint 10. The fibers, especially if they are carbon fibers, may also result in galvanic corrosion as water or other moisture absorbed by the fibers 16 comes into contact with metal parts or fasteners.

Figure 3:
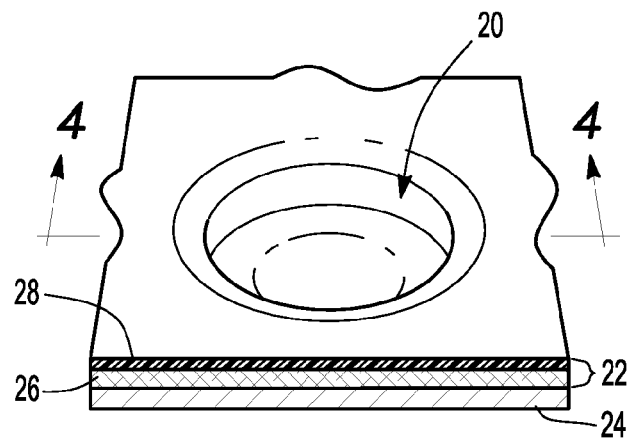
FIG. 3 is a fragmentary perspective view of a clinch joint joining a composite fiber reinforced panel to another panel in accordance with one aspect of this disclosure.
Figure 4:
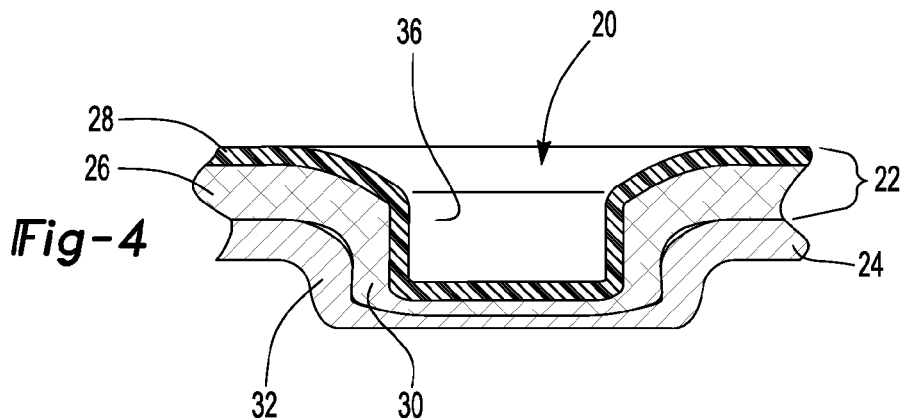
FIG. 4 is a cross-sectional view taken along the line 4-4 in FIG. 3.

Referring to FIGS. 3 and 4, an improved clinch joint 20 is shown that is directed to solving the problem of exposed fibers in the clinch joint 10 described with reference to FIGS. 1 and 2. The improved clinch joint 20 is formed in an encased fiber reinforced composite part 22, or first part. The first part 22 is connected to a substrate panel 24, or second part, by the clinch joint 20. The fiber reinforced part 22 includes a layer 25 that is reinforced with fibers 26. This layer 25 is also referred to in this disclosure as a first layer. The layer reinforced with fibers 26 may be reinforced with carbon fibers, glass fibers, natural fibers, or talc that are encased in a resin composition.

A neat resin layer 28, or second layer, forms part of the fiber reinforced composite part 22. The neat resin layer 28 consists essentially of the resin used to form the fiber reinforced composite part 22.

The fiber reinforced composite part 22 is preferably formed in a compression molding operation in a compression molding die. The compression molding die may include a textured surface on the surface facing the resin layer 28. The textured surface may function to exclude fibers from the layer reinforced with fibers 26 and thereby form the neat resin layer 28. Compression molding tools for forming fiber reinforced composite parts are well known and such tools are also well known that include a textured surface for esthetics.

The improved clinch joint 20 includes a pressed out portion 30 formed in the fiber reinforced composite part 22. The pressed out portion 30 is pressed into a clinching portion 32 formed in the substrate panel 24. The neat resin layer 28 encases the fibers 26 that would otherwise be exposed during the clinching operation in the pressed out portion 30 and provides the desired fiber-free smooth interior surface 36 of the clinch joint 20. By encasing the fibers 26 with the neat resin layer 28, the tendency of any fibers 26 to become exposed within the clinch joint 20 is eliminated or at least minimized and thereby reduces the chance of moisture being absorbed by the fibers 26 in the layer 25 reinforced by the fibers 26.

The neat resin layer 28 is preferably 0.5 to 1.5 mm thick. The thickness of the encased fiber reinforced composite part 22 is preferably 0.5 to 6 mm thick and typically from 2.5 to 3 mm thick. The substrate panel 24 is preferably 0.5 to 6 mm thick and typically between 2.5 to 3 mm thick. The substrate layer is preferably metal such as aluminum, steel, magnesium, or may also be another fiber reinforced composite part.

Figure 5:
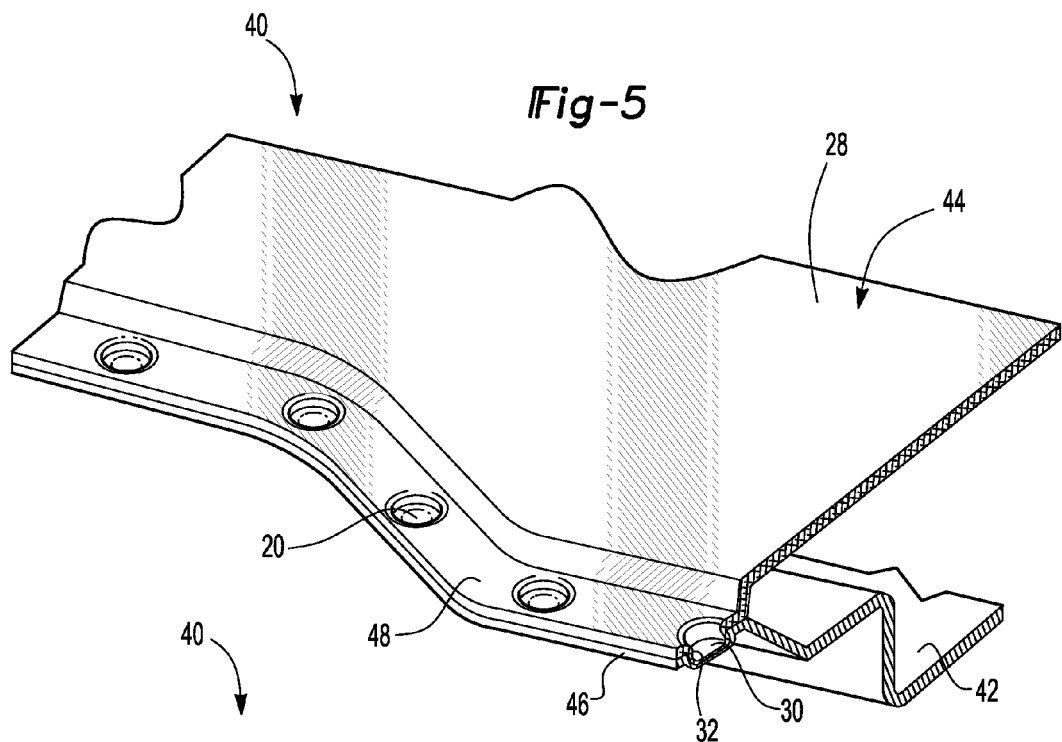
FIG. 5 is a fragmentary perspective view of a plurality of clinch joints in a flange of a composite fiber reinforced panel that has a fiber-free coating of resin applied to one side being joined to a mating flange of another panel.

Referring to FIG. 5, an assembly 40 is partially shown that includes an inner panel 42 and an outer panel 44 that are joined together by an inner flange 46 and an outer flange 48. As shown in FIG. 5, the resin layer 28 is provided on the top surface and is indicated by shading stripes extending across the entire top surface to denote a smooth resin surface. A plurality of clinch joints 20 are shown connecting the inner flange 46 to the outer flange 48 with the inner flange clinching a pressed out portion 30 of the outer flange 48.

Figure 6:
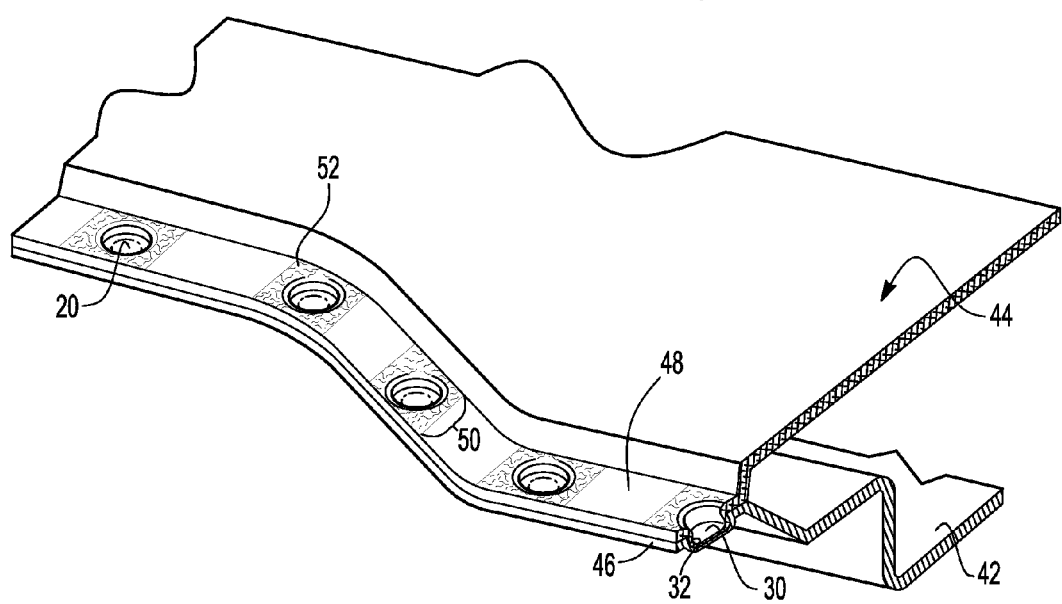
FIG. 6 is a fragmentary perspective view of a plurality of clinch joints in a flange of a composite fiber reinforced panel that has a fiber-free coating of a resin applied to only selected portions of the flange being joined to a mating flange of another panel.

Referring to FIG. 6, an assembly 40 is shown that includes an inner panel 42 that is married to an outer panel 44. An inner flange 46 of the inner panel 42 is connected by a clinch joint 20 to the outer flange 48 of the outer panel 44. A partial area 50 of the outer flange 48 is provided with a textured surface 52. The textured surface 52 is formed in the compression molding operation by providing an orange peel textured surface on the surface of the compression molding die that forms the textured surface 52 on the outer flange 48. Other types of textured surfaces may also be formed in the compression molding operation.

Referring to FIGS. 7A and 7B, alternative embodiments of a composite panel 60 are illustrated that are formed of a polymeric resin 62 and reinforced with fiber reinforcements 64 in FIG. 7A. In FIG. 7B, a fiber mat 65 is shown embedded in the resin 62 to illustrate an alternative to the loose fibers 64. An intended clinch joint location 66 consists essentially of pure or neat resin 62. The surrounding portions of the panel 60 include the fiber reinforcements 64 or fiber mat 65. While discontinuous, or loose fiber reinforcements 64 may be used, a woven mat of fiber having cut-outs in the intended clinch joint locations 66 may be easier to process. The woven mat 65 also may be braided or stitched continuous fiber reinforcements 64.

Referring to FIGS. 8A and 8B, the composite panels 60 are illustrated after a clinch joint 68 is formed to join the composite panel 60 and a second panel 70. The composite panel 60 includes a pressed out portion 72 that is received in a clinching portion 74 of the second panel 70. The clinch joint 68 does not have any exposed fibers because no fiber reinforcements 64 (in FIG. 8A) or fiber mat 65 (shown in FIG. 8B) are disposed in the intended clinch joint locations 66.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An assembly comprising:
   a first part including resin reinforced with fibers throughout except in areas that are intended clinch joint forming areas; and
   a second part joined to the first part by a clinch joint formed as a pressed-out portion in the intended clinch joint forming areas pressed into a clinching portion of the second part, wherein a lack of fibers in the intended clinch joint forming area avoids exposed fibers in the clinch joint.

2. The assembly of claim 1 wherein the fibers are loose fibers.

3. The assembly of claim 1 wherein the fibers are continuous fibers in a mat.

* * * * *